Feb. 26, 1929. C. NEWMAN ET AL Re. 17,222

BOX SUPPORTING EAR

Original Filed Nov. 8, 1924

Witness:
R. Burkhardt.

Inventors:
Charles Newman,
Ernest G. Appleton,
By Wilkinson Huxley Byron & Knight
Attys.

Reissued Feb. 26, 1929. Re. 17,222

UNITED STATES PATENT OFFICE.

CHARLES NEWMAN, OF NEW YORK, N. Y., AND ERNST G. APPLETON, OF CHICAGO, ILLINOIS, ASSIGNORS TO ROACH-APPLETON MFG. COMPANY, OF CHICAGO, ILLINOIS, A CORPORATION OF ILLINOIS.

BOX-SUPPORTING EAR.

Original No. 1,597,243, dated August 24, 1926, Serial No. 748,546, filed November 8, 1924. Application for reissue filed June 15, 1928. Serial No. 285,652.

This invention relates to a new and improved box supporting ear, and more particularly to an ear adapted for use with switch boxes or the like in supporting them from building studding.

Switch and junction boxes and the like are manufactured in a wide variety of types, but in general are supported from the building structure by means of ears which are adjustably secured to the box and have outturned portions extending in a plane parallel to the face of the box for securing the ears to lath or cross pieces. These ears project from the ends of the usual types of switch boxes, and since the boxes are normally used extending vertically in the walls, it is necessary to provide supporting cross pieces between adjacent studs to receive the ears.

It is an object of the present invention to provide a box supporting ear adapted to be secured to the end of the box and to engage a member extending adjacent to the side of the box to support the box therefrom.

It is a further object to provide a box supporting ear of this type having integral means adapted to fix it in relation to the box supporting member.

It is also an object to provide a laterally extending box supporting ear provided with a stiffening corrugation and adapted to be formed from sheet metal.

It is an additional object to provide a box supporting ear having means for properly spacing the box from the support to which it is secured.

Other and further objects will appear as the description proceeds.

We have shown in the accompanying drawings one preferred form of construction. In the drawings—

Figure 1:
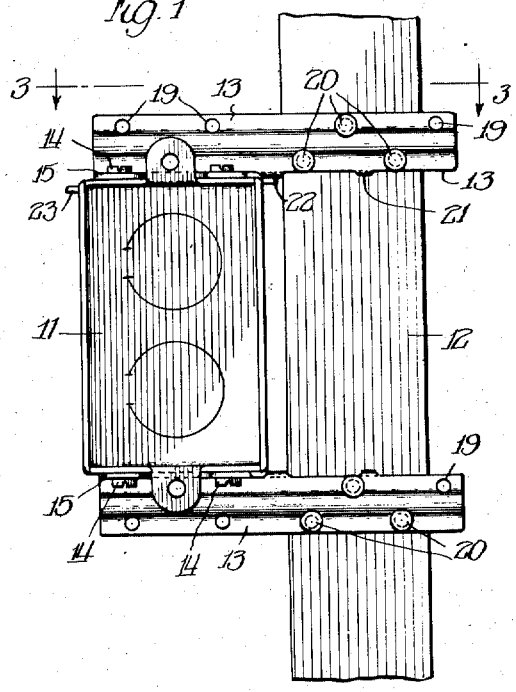
Figure 1 is a face view of a box attached by means of our supporting ears.
Figure 2:
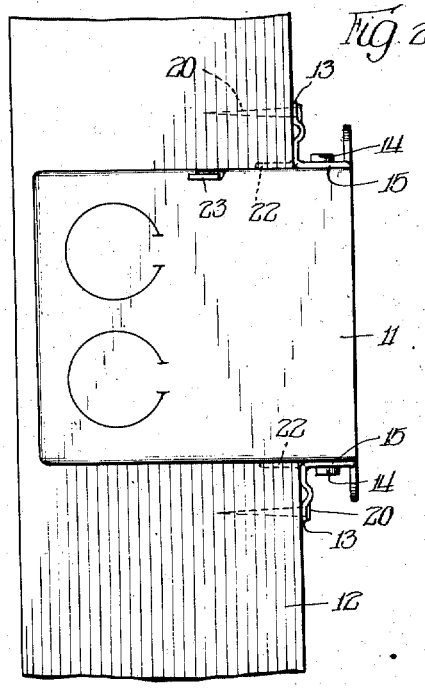
Figure 2 is a view of Figure 1 as seen from the left.

In the drawings a typical form of switch box 11 has been shown supported from a vertically extending stud 12 by means of the box supporting ears 13.

Figure 3:
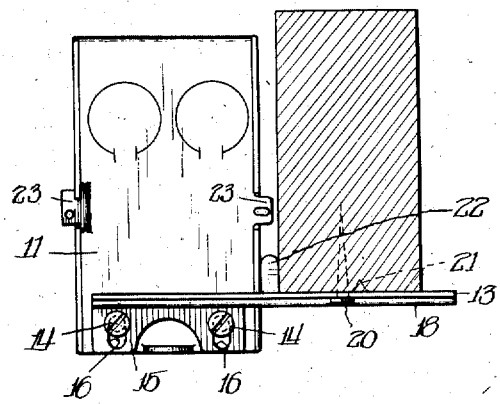
Figure 3 is a view of Figure 1 as seen from above.

As shown in Figure 3, the box 11 is provided at its ends with the screws 14 adapted to secure the ears to the box. This is a usual construction, as the boxes are commonly supported by ears secured to the box in this manner.

Figure 4:
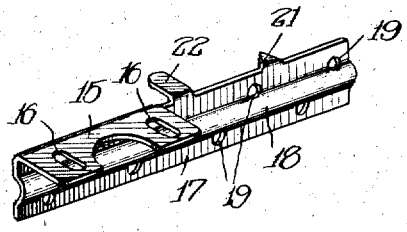
Figure 4 is a perspective view of the supporting ear.

As best shown in Figure 4, the present ear comprises a securing portion 15 adapted to lie flat against the end wall of the box, this portion being provided with the elongated slots 16 adapted to adjustably receive the screws 14. The ear is further provided with the attaching portion 17, which is bent up at right angles to the portion 15 and which consequently is located in a plane substantially parallel to the box face when the ear is attached to the box. The portion 17 is provided with the stiffening corrugation 18 and the plurality of perforations 19, which latter are adapted to receive nails 20 or other means for securing the ear to a stud or other supporting means. The ears, therefore, form cantilever supports.

The upper edge of the ear portion 17 is provided with a pointed, down-turned lug 21, which is for the purpose of insuring the placing of the box properly parallel to the supporting stud and evenly spaced therefrom when the box is spaced well away from the stud. In this case, nails would be driven into the stud only through the two holes shown beyond the lug 21. When the box is placed closely adjacent to the stud, the lug 21 is forced into the stud as shown in the drawing.

The ears are also provided with the lugs 22, which serve to space the box from the support and facilitate its being placed parallel thereto, the side edges of said lugs 22 distant from the switch box being equi-spaced from said switch box in a plane normal to the face of said switch box. These lugs 22 are of sufficient width to provide clearance for the box assembly ears 23. A decided advantage accruing from the provision of the lugs 22—22 equi-spaced from the switch box, as well as the pointed lugs 21—21, is that rapid work is permitted on the part of the artisan erecting the switch boxes. Said artisan may use said lugs 22—22 as locating means for positioning the box, after which he may drive the lugs 21—21 into the material of the support 12 with light hammer blows. The box is thus located and held in position, permitting said artisan to drive the nails 20—20 at his convenience or to proceed with another job, leaving the driving of such nails to a coworker.

By the use of our improved ear it is possible to secure switch boxes or the like to vertically extending studs, and the necessity for extra cross timbers for supporting the box is illuminated. The ear is simple in design and construction and may be cheaply manufactured from sheet metal. It is adapted for ready attachment to standard forms of switch or junction boxes.

While we have shown one preferred form of our ear by way of illustration, it is to be understood that we contemplate such changes and modifications as come within the scope of the appended claims.

What is claimed is—

1. A cantilever support for a switch box comprising an ear swedged out of a single piece of metal, said ear comprising an elongated attaching portion having holes for the reception of attaching means for connecting same to a wall stud, said ear also comprising a securing portion mounted at one end of said attaching portion and projecting substantially at right angles to the plane of said attaching portion, said securing portion having holes for the reception of attaching means for connecting same to the wall of a switch box, said ear also including a pair of lugs projecting from said attaching portion, one of said lugs being pointed and adapted to dig into a wall stud, the other of said lugs being adapted to lie against said wall stud for locating said ear relative to said wall stud.

2. A cantilever support for a switch box comprising an ear swedged out of a single piece of metal, said ear comprising an elongated attaching portion having holes for the reception of attaching means for connecting same to a wall stud, said ear also comprising a securing portion mounted at one end of said attaching portion and projecting substantially at right angles to the plane of said attaching portion, said ear also including a pair of lugs projecting from said attaching portion, one of said lugs being pointed and adapted to dig into a wall stud, the other of said lugs being adapted to lie against said wall stud for locating said ear relative to said wall stud.

3. A switch box provided with a pair of ears extending from opposed walls thereof, each of said ears comprising an elongated attaching portion having holes for the reception of attaching means for connecting same to a wall stud, each of said ears also including a pointed lug projecting from said attaching portion, said lugs being equi-spaced from said switch box.

4. A switch box provided with a pair of ears extending from opposed walls thereof, each of said ears comprising an elongated attaching portion having holes for the reception of attaching means for connecting same to a wall stud, each of said ears also including a lug projecting from said attaching portion, said lugs having surfaces equi-spaced from said switch box in a plane normal to the face of said switch box, each of said ears having other lugs spaced outwardly from said switch box relative to said first mentioned lugs, said other lugs being pointed and adapted to dig into a wall stud.

Signed by CHARLES NEWMAN, at New York, New York, the 19 day of May, 1928, and by ERNST G. APPLETON, at Chicago, Illinois, the 21st day of May, 1928.

CHARLES NEWMAN.
ERNST G. APPLETON.